(12) United States Patent
Chen et al.

(10) Patent No.: US 11,919,386 B2
(45) Date of Patent: Mar. 5, 2024

(54) POWERTRAIN AND VEHICLE INCLUDING SAME

(71) Applicant: BYD COMPANY LIMITED, Shenzhen (CN)

(72) Inventors: Guangquan Chen, Shenzhen (CN); Chunlei Liu, Shenzhen (CN); Bing Li, Shenzhen (CN); Xin Wen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 867 days.

(21) Appl. No.: 16/969,173

(22) PCT Filed: Jan. 29, 2019

(86) PCT No.: PCT/CN2019/073568
§ 371 (c)(1),
(2) Date: Aug. 11, 2020

(87) PCT Pub. No.: WO2019/154164
PCT Pub. Date: Aug. 15, 2019

(65) Prior Publication Data
US 2020/0398664 A1 Dec. 24, 2020

(30) Foreign Application Priority Data

Feb. 12, 2018 (CN) .......................... 201810145468.8

(51) Int. Cl.
*B60K 17/04* (2006.01)
*B60K 1/00* (2006.01)
(Continued)

(52) U.S. Cl.
CPC .............. *B60K 17/04* (2013.01); *B60K 1/00* (2013.01); *B60K 17/22* (2013.01);
(Continued)

(58) Field of Classification Search
CPC .......... B60K 17/04; B60K 1/00; B60K 17/22; B60K 2001/001; B60K 17/06;
(Continued)

(56) References Cited

U.S. PATENT DOCUMENTS 9,750,191 B2   9/2017  Richardson et al.
2013/0300403 A1  11/2013  Benson et al.
(Continued)

FOREIGN PATENT DOCUMENTS

CN      201619446 U    11/2010
CN      201824898 U     5/2011
(Continued)

OTHER PUBLICATIONS

Machine translation of CN 106608169A, Min et al., May 3, 2017 (Year: 2017).*
(Continued)

*Primary Examiner* — Vinh Luong
(74) *Attorney, Agent, or Firm* — ANOVA LAW GROUP, PLLC

(57) ABSTRACT

A powertrain and a vehicle including the powertrain are provided. The powertrain includes: an electric motor; a transmission mounted to the electric motor and defining, together with the electric motor, an angled space for helping a half shaft of the transmission to extend along an axial direction of the transmission; a controller mounted to at least one of the electric motor and the transmission and electrically connected to the electric motor, where the controller, the transmission, and the electric motor are integrated together, at least one part of the controller being located in the angled space.

17 Claims, 8 Drawing Sheets

(51) Int. Cl.
  *B60K 17/22* (2006.01)
  *B60R 16/02* (2006.01)
  *F16H 57/00* (2012.01)
  *H02K 7/00* (2006.01)
  *H02K 7/116* (2006.01)
  *H02K 11/33* (2016.01)

(52) U.S. Cl.
  CPC ......... *B60R 16/0207* (2013.01); *F16H 57/00* (2013.01); *H02K 7/006* (2013.01); *H02K 7/116* (2013.01); *H02K 11/33* (2016.01)

(58) Field of Classification Search
  CPC ..... B60R 16/0207; F16H 57/00; H02K 7/006; H02K 7/116; H02K 11/33; H02K 11/30; B60Y 2400/61; B60Y 2410/10
  See application file for complete search history.

(56) References Cited

U.S. PATENT DOCUMENTS

| | | | |
|---|---|---|---|
| 2015/0251531 A1 | 9/2015 | Hotta et al. | |
| 2018/0180167 A1* | 6/2018 | Peterson | F16H 61/0213 |
| 2019/0379262 A1* | 12/2019 | Speck | B60K 26/00 |
| 2021/0044181 A1* | 2/2021 | Ishikawa | H02K 11/33 |
| 2022/0345009 A1* | 10/2022 | Yokozawa | H02K 7/116 |

FOREIGN PATENT DOCUMENTS

| | | | | |
|---|---|---|---|---|
| CN | 102267362 A | | 12/2011 | |
| CN | 102463880 A | | 5/2012 | |
| CN | 102774279 A | | 11/2012 | |
| CN | 106163848 A | * | 11/2016 | ........... B60K 17/358 |
| CN | 106608169 A | * | 5/2017 | ............ B60K 17/06 |
| CN | 107298015 A | | 10/2017 | |
| CN | 107650675 A | | 2/2018 | |
| CN | 206968398 U | | 2/2018 | |
| DE | 112014001112 T5 | | 12/2015 | |
| EP | 3750729 A1 | * | 12/2020 | ............... B60K 1/00 |
| TW | M554061 U | | 1/2018 | |
| WO | 2018149450 A1 | | 8/2018 | |
| WO | WO 2019154165 A1 | * | 8/2019 | ............... B60K 1/00 |
| WO | WO 2022197642 A1 | * | 9/2022 | ............. B60K 17/12 |

OTHER PUBLICATIONS

Machine translation of CN 106163848 A, Perlo et al., Nov. 23, 2016 (Year: 2016).*
EPO machine translation of Description and Claims of TWN554061U, Yi et al., dated Jan. 11, 2018 (Year: 2018).*
The World Intellectual Property Organization (WIPO) International Search Report for PCT/CN2019/073568 dated Apr. 4, 2019 5 Pages.

* cited by examiner

US 11,919,386 B2

1

POWERTRAIN AND VEHICLE INCLUDING SAME

CROSS-REFERENCE TO RELATED APPLICATIONS

The present application is a national phase entry under 35 U.S.C. § 371 of International Application No. PCT/CN2019/073568, filed on Jan. 29, 2019, which is based on and claims priority to Chinese patent application No. 201810145468.8, filed on Feb. 12, 2018, content of all of which is incorporated herein by reference in its entirety.

FIELD

The present disclosure relates to the field of vehicle technologies and, in particular, to a powertrain and a vehicle provided with the same.

BACKGROUND

In a powertrain 10' in the related art, as shown in FIG. 1, a transmission 1' and an electric motor 2' are designed separately and fixed by a mold assembly bolt to form the powertrain 10' mounted on a frame by suspension. A controller 3 is arranged separately from the electric motor 2' and is mounted on the frame above the electric motor 2' and the transmission 1'. A controller signal is transmitted to the electric motor 2' through a three-phase wire for controlling operation of the powertrain 10'.

In such form of powertrain, the controller 3' is arranged separately and is mounted on the frame above the transmission 1' and the electric motor 2', occupying a large space of an entire vehicle. In addition, a height of the powertrain cannot meet requirements of a rear drive of the entire vehicle, and a wire harness such as the three-phase wire is relatively long, occupying a large space of the entire vehicle, affecting the appearance, and requiring a high protection level.

SUMMARY

The present disclosure is intended to resolve at least one of technical problems existing in the prior art. Accordingly, the present disclosure provides a powertrain. The powertrain is characterized with advantages of a compact structure and simple wire harness connection.

The present disclosure further provides a vehicle including the powertrain.

A powertrain provided according to an embodiment in a first aspect of the present disclosure includes: an electric motor; a transmission mounted to the electric motor and defining, together with the electric motor, an angled space for helping a half shaft of the transmission to extend along an axial direction of the transmission; a controller mounted to at least one of the electric motor and the transmission and electrically connected to the electric motor; where the controller, the transmission, and the electric motor are integrated together, at least one part of the controller being located in the angled space.

For the powertrain according to the embodiments of the present disclosure, the controller, the transmission, and the electric motor are integrated together, and the controller is mounted in the angled space defined between the transmission and the electric motor, so that the powertrain is characterized with advantages of a compact structure and simple wire harness connection, etc.

2

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where.

DETAILED DESCRIPTION

Figure 1:
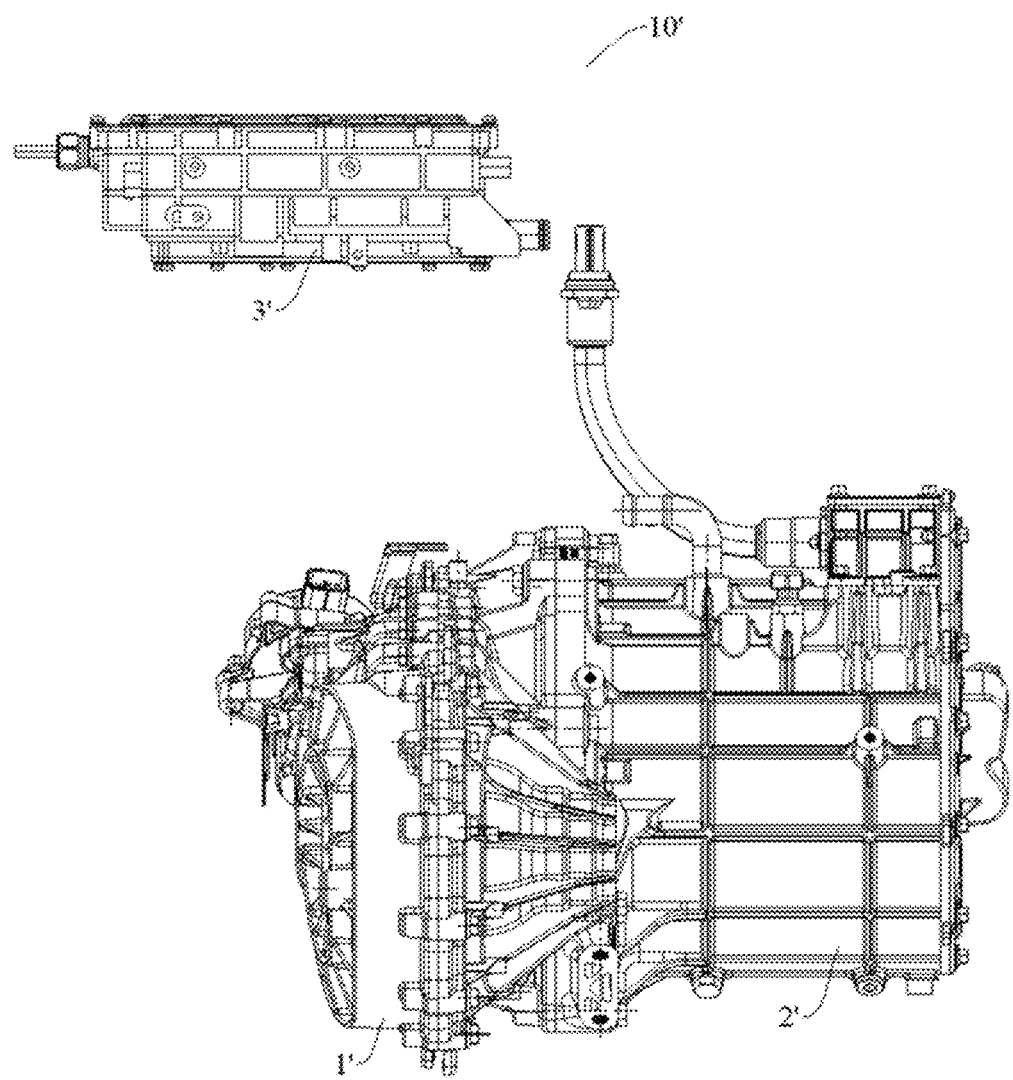
FIG. 1 is a schematic structural view of a powertrain system in the related art.

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

In the description of the present disclosure, it should be understood that orientation or position relationships indicated by the terms such as "center", "vertical", "horizontal", "length", "width", "above", "below", "front", "rear", "left", "right", "vertical", "horizontal", "top", "bottom", "inside", "outside", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, a feature defined to be "first" or "second" may explicitly or implicitly include one or more features. In the description of the present disclosure, unless stated otherwise, the meaning of "a plurality of" is two or more than two.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present disclosure according to specific situations.

A powertrain 100 according to an embodiment of the present disclosure is described below with reference to FIG. 2 to FIG. 7.

As shown in FIG. 2 to FIG. 5, the powertrain 100 according to an embodiment of the present disclosure includes: an electric motor 10, a transmission 20, and a controller 30.

The transmission 20 is mounted to the electric motor 10, and the transmission 20 is mounted on the electric motor 10. The transmission 20 and the electric motor 10 jointly define an angled space 40 for helping a half shaft (not shown) of the transmission to extend in an axial direction of the transmission. The controller 30, the transmission 20, and the electric motor 10 are integrated together. At least one part of the controller 30 is located in the angled space 40. In particular, the electric motor 10 is mounted on one side of the transmission 20 in a horizontal direction. A transmission shaft (not shown) of the transmission 20 is connected to the electric motor 10. The half shaft of the transmission 20 is mounted to the electric motor 10 and is on the same side as the transmission 20, and the half shaft of the transmission 20 is parallel to the axial direction of the electric motor 10. The angled space 40 is defined by the electric motor 10 and the transmission 20. The angled space 40 is located on a side of the electric motor 10 facing the half shaft of the transmission 20, and the angled space 40 is located on a side of the transmission 20 facing the electric motor 10. In other words, the angled space 40 respectively abuts against the side of the electric motor 10 facing the transmission 20 and the side of the transmission 20 facing the electric motor 10.

It may be understood that an angle of the angled space enclosed by the electric motor 10 and the transmission 20 is less than 180 degrees.

The controller 30 is mounted to at least one of the electric motor 10 and the transmission 20 and is electrically connected to the electric motor 10. The controller 30, the transmission 20, and the electric motor 10 are integrated together. The controller 30 includes a controller body and a controller support 31 located in the angled space 40.

In embodiments shown in FIG. 2 to FIG. 5, the electric motor 10 is mounted on both the electric motor 10 and the transmission 20. The controller 30 is electrically connected to the electric motor 10. The controller 30 is configured to control start, stop, and a rotation speed, etc. of the electric motor 10. The controller body is disposed in the angled space 40. It may be understood that the controller body refers to a function bearing part of the controller 30, that is, a part for achieving a control function, and does not include parts such as a mounted support. The controller 30 and the electric motor 10 are disposed on the same side of the transmission 20, and the controller 30 and the half shaft of the transmission 20 are disposed on the same side of the electric motor 10. That the controller 30, the transmission 20, and the electric motor 10 are integrated together refers to that the controller 30, the transmission 20, and the electric motor 10 form a unity in a structural space. It may be understood that the electric motor 10 not only may be mounted on the controller 30 and the transmission 20, but also may be mounted on the controller 30 only, or on the transmission 20 only.

For the powertrain 100 according to an embodiment of the present disclosure, the angled space 40 is defined between the transmission 20 and the electric motor 10, and the controller 30, the transmission 20, and the electric motor 10 are integrated together, so that the powertrain 100 has a compact structure. The controller 30 is mounted on the transmission 20 and the electric motor 10. A three-phase wire connected between the controller 30 and the electric motor 10 is relatively short, and there is no need to dispose a relatively long connecting wire harness, saving a mounting space and causing powertrain 100 to be simple and beautiful as a whole. In addition, mounting points of the controller 30 on the frame are reduced, an entire vehicle structure is simplified, assembly procedures are reduced, production costs and development costs are reduced, and the center of gravity of the powertrain 100 is lowered, so that the powertrain may be applied to a front-drive vehicle and a rear-drive vehicle.

In addition, because the controller body is disposed in the angled space 40, space of the angled space 40 may be utilized to move the controller 30 downward into the angled space 40, thereby reducing an overall height of the powertrain 100.

Therefore, the powertrain 100 according to embodiments of the present disclosure is characterized with advantages of a compact structure and simple wire harness connection, etc.

The powertrain 100 according to the embodiments of the present disclosure is described in detail below with reference to FIG. 2 to FIG. 7.

Figure 3:
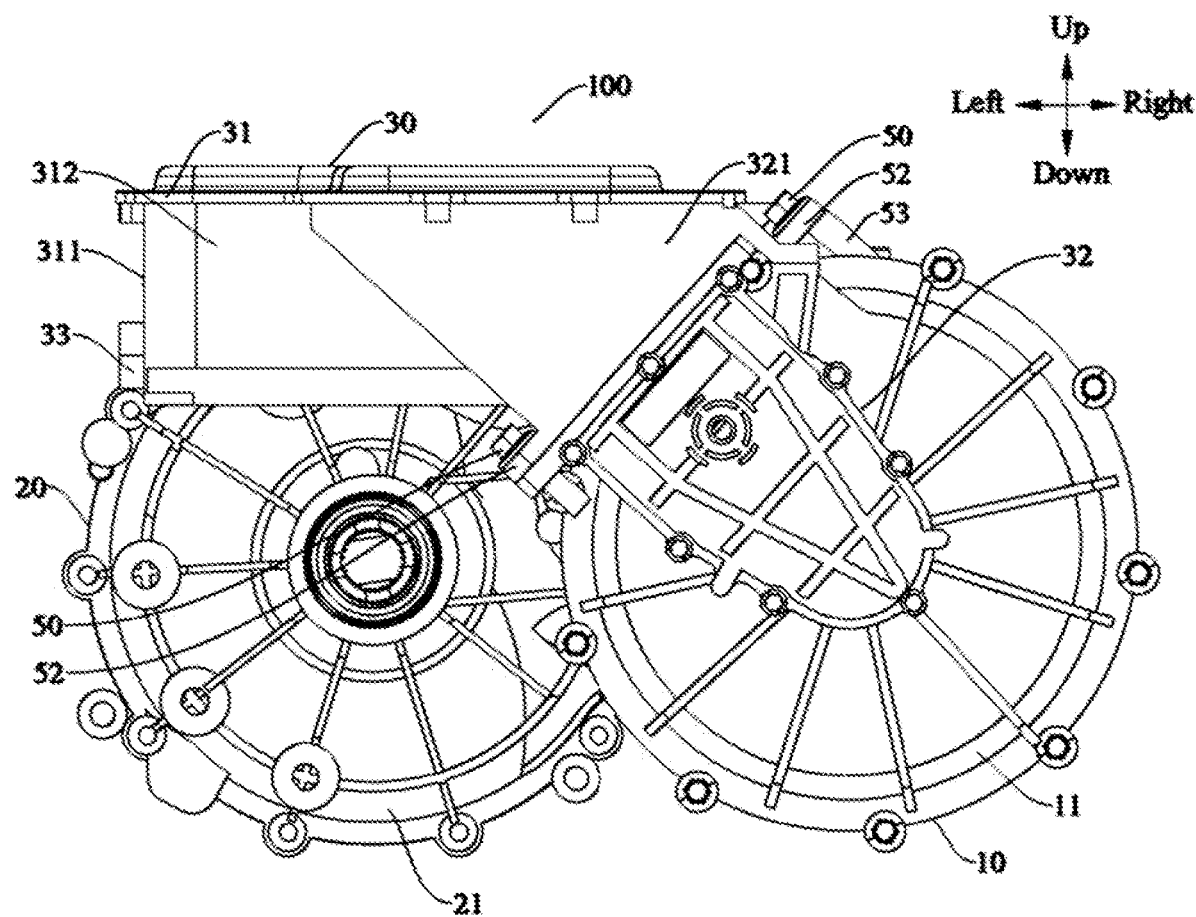
FIG. 3 is a front view of a powertrain according to an embodiment of the present disclosure.

In some embodiments of the present disclosure, as shown in FIG. 3, a lowest point of the controller body is lower than a highest point of the electric motor 10 and/or a highest point of the transmission 20. When the highest point of the electric motor 10 is lower than the highest point of the transmission 20, the lowest point of the controller 30 is lower than the highest point of the transmission 20. When the highest point of the electric motor 10 is higher than the highest point of the transmission 20, the lowest point of the controller 30 is lower than the highest point of the electric motor 10. When the highest point of the electric motor 10 is at an equal height with the highest point of the transmission 20, the lowest point of the controller 30 is lower than the highest point of the electric motor 10 and the highest point of the transmission 20.

Figure 5:
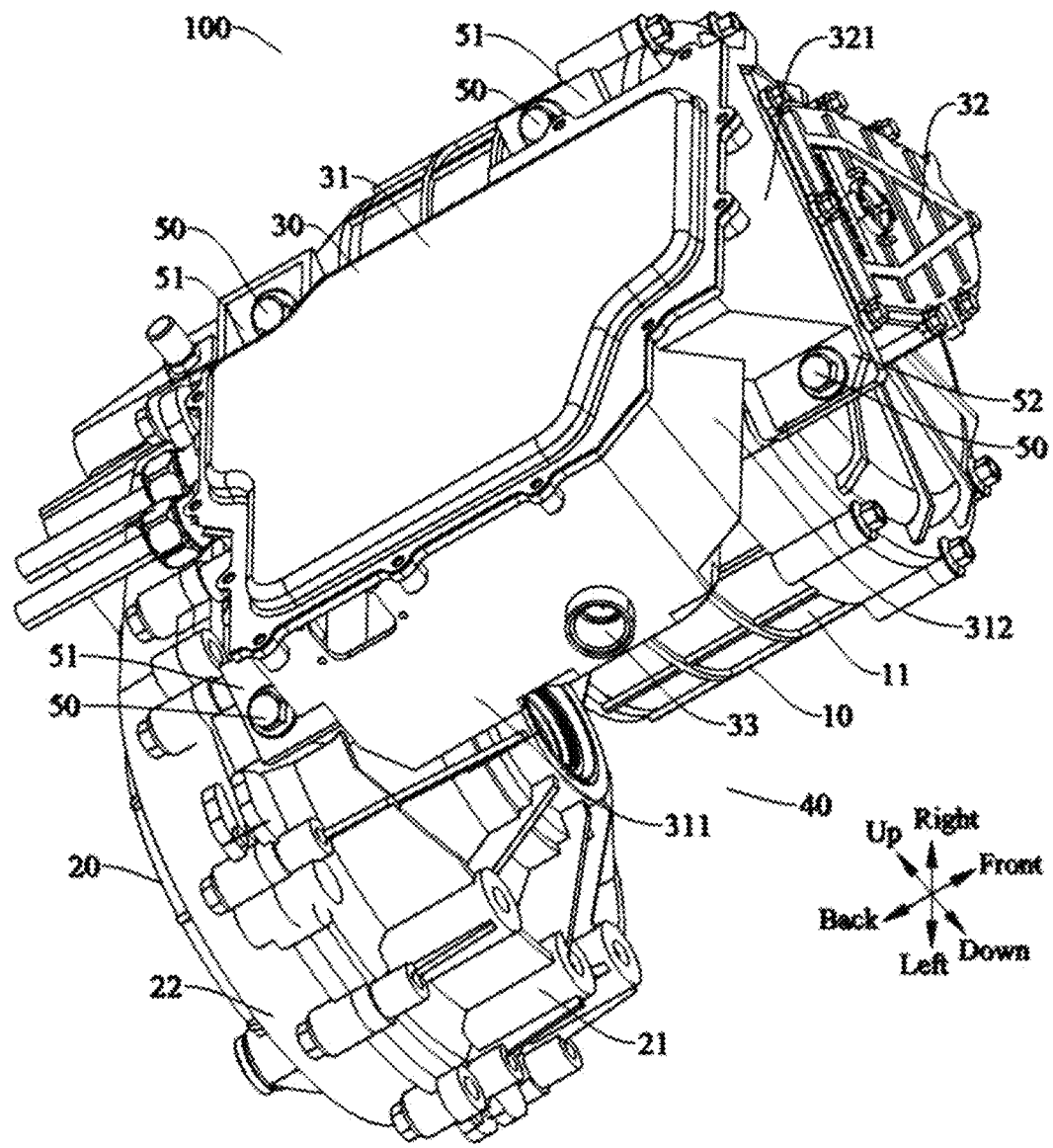
FIG. 5 is a three-dimensional view of a powertrain according to an embodiment of the present disclosure.

In particular, the lowest point and the highest point are located at a direction perpendicular to a horizontal plane, that is, an up-down direction shown in FIG. 5. The lowest point of the controller 30 is the lowest point of the controller 30 in the up-down direction. The highest point of the electric motor 10 is the highest point of the electric motor 10 in the up-down direction. The highest point of the transmission 20 is the highest point of the transmission 20 in the up-down direction. The lowest point of the controller 30 is lower than the highest point of the electric motor 10 and/or the highest point of the transmission 20. Accordingly, a height of the unity formed by the controller 30, the electric motor 10, and the transmission 20 in the up-down direction shown in FIG. 3 is the smallest, so that an overall structure formed by the controller 30, the electric motor 10, and the transmission 20 is more compact and occupies a smaller space.

Figure 4:
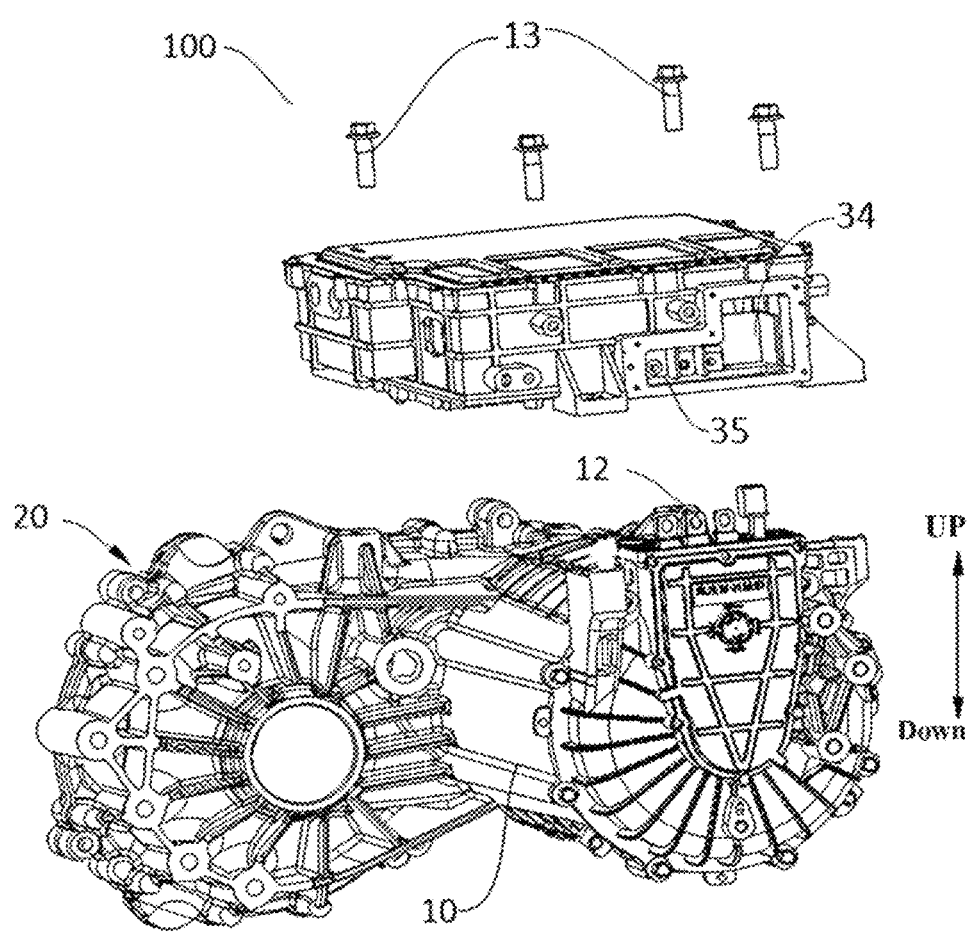
FIG. 4 is a schematic view of electric connection between a controller and an electric motor of a powertrain according to an embodiment of the present disclosure.

In some embodiments of the present disclosure, as shown in FIG. 2 to FIG. 5, the controller 30 is mounted above the half shaft. In a specific embodiment of the present disclosure, as shown in FIG. 4, the controller 30 has a mounting groove 34.

Optionally, the mounting groove 34 is disposed on a side of the controller 30, and a part of the electric motor 10 is inserted into the mounting groove 34 from a bottom of the mounting groove 34. For example, in an embodiment shown in FIG. 4, the mounting groove 34 may be disposed on a fourth side surface 312, and the mounting groove 34 is open toward one side. In addition, a side wall at a bottom of the mounting groove 34 has a through hole. The electric motor 10 is partially inserted into the mounting groove 34 from the bottom of the mounting groove 34, so that the electric motor 10 and the controller 30 are detachably connected.

Further, still referring to embodiments shown in FIG. 4, the controller 30 includes a controller three-phase wire connection portion 35. The controller three-phase wire connection portion 35 is located in the mounting groove 34. The electric motor 10 includes an electric motor three-phase wire connection portion 12. The controller three-phase wire connection portion 35 is electrically connected to the electric motor three-phase wire connection portion 12. During assembly, the controller 30 may be mounted on a top of the electric motor 10, and then the electric motor three-phase wire connection portion 12 is extended into the mounting groove 34, so that the controller three-phase wire connection portion 35 is electrically connected to the electric motor three-phase wire connection portion 35.

According to an embodiment of the present disclosure, as shown in FIG. 4, the controller three-phase wire connection portion 35 is docked with the electric motor three-phase wire connection portion 12 and connected to the electric motor three-phase wire connection portion through a connecting member 13. The connecting member 13 may be a conductive bolt or a conductive sheet provided with an inserting hole. Accordingly, an electrical connection between the controller 30 and the electric motor 10 has a simple structure and is easy to assemble and disassemble.

The controller 30 is described in detail below with reference to FIG. 2 to FIG. 5.

According to an embodiment of the present disclosure, the controller 30 includes: a controller body, a controller support 31, and a wire harness rack 32.

The controller body is disposed on the controller support 31. The controller support 31 is mounted on at least one of the electric motor 10 and the transmission 20. The wire harness rack 32 is mounted on the controller support 31 and the electric motor 10. A wire arrangement groove 321 is disposed in the wire harness rack 32. The connecting wire harness between the controller 30 and the electric motor 10 is disposed in the wire arrangement groove 321.

In particular, the controller body is disposed on the controller support 31. As shown in FIG. 2 to FIG. 5, the controller support 31 is a housing. The controller body may be disposed in the controller support 31. The controller support 31 may be mounted on the electric motor 10 or the transmission 20, or mounted on both the electric motor 10 and the transmission 20. In an embodiment shown in FIG. 2 to FIG. 4, the controller support 31 is mounted on both the electric motor 10 and the transmission 20, the wire harness rack 32 is mounted on the controller support 31 and the electric motor 10, and the wire arrangement groove 321 is in communication with the electric motor 10 and the controller support 31, and the wire arrangement groove 321 is configured to accommodate a connecting wire harness of the controller 30 and the electric motor 10. Accordingly, the wire arrangement groove 321 serves to accommodate and protect the connecting wire harness, thereby causing the powertrain 100 to be entirely simple and beautiful. According to some other embodiments of the present disclosure, the controller support 31 may also be an open fixing support. The controller body is fixed on the controller support 31.

Figure 2:
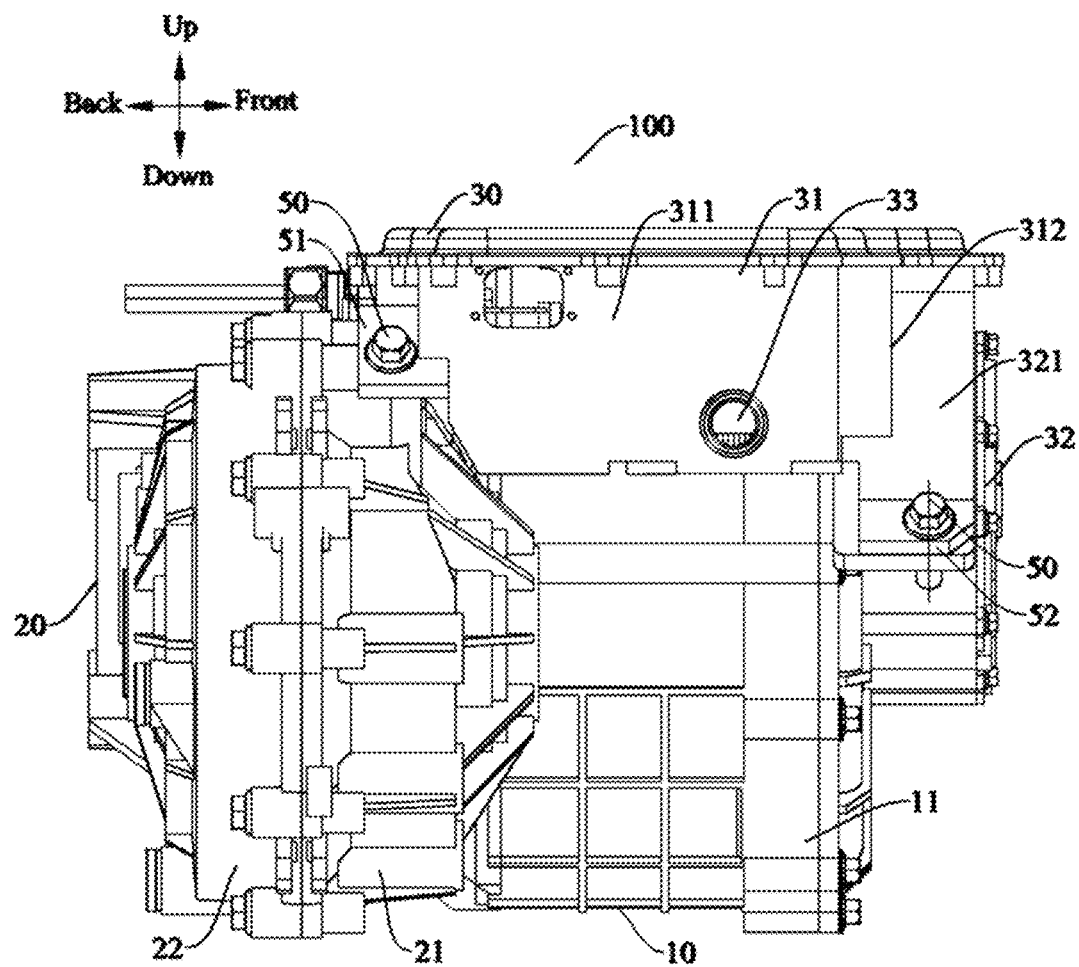
FIG. 2 is a side view of a powertrain according to an embodiment of the present disclosure.

Optionally, as shown in FIG. 2 and FIG. 5, the wire harness rack 32 and the transmission 20 are respectively located on two opposite sides of the electric motor 10 in a horizontal direction. In other words, the wire harness rack 32 and the transmission 20 are respectively disposed on two opposite sides of the electric motor 10 in an axial direction of the electric motor 10. As shown in FIG. 4, the wire harness rack 32 is disposed on a front side of the electric motor 10 in the horizontal direction, and the transmission 20 is disposed on a rear side of the electric motor 10 in the horizontal direction.

Still referring to embodiments shown in FIG. 3 and FIG. 5, the wire harness rack 32 extends obliquely relative to an up-down direction and along a radial direction of the electric motor 10. In particular, a cross section of the electric motor 10 along an axial direction thereof is circular, and the wire harness rack 32 is disposed on an end surface of the electric motor 10. The wire harness rack 32 extends obliquely from a center of a circle of the cross section of the electric motor 10 along a radial direction of the electric motor 10 to a left side of the entire electric motor 10.

Further, the controller support 31, the electric motor 10, and the transmission 20 are mounted through threaded fasteners 50, and the wire harness rack 32 and the electric motor 10 are mounted through the threaded fasteners 50. The threaded fasteners 50 may be bolts. Screw holes are disposed on the electric motor 10 and the transmission 20. The bolts pass through the controller support 31 and the wire harness rack 32 to be inserted into screw holes with internal threads on the electric motor 10 and the transmission 20. Accordingly, fixing between the controller support 31, the electric motor 10, and the transmission 20, and between the wire harness rack 32 and the electric motor 10 through the threaded fasteners 50 are effective, and mounting is convenient.

Still referring to embodiments shown in FIG. 2 to FIG. 5, the threaded fastener 50 mounted on the electric motor 10 extend obliquely relative to the up-down direction and along a radial direction of the electric motor 10, and the threaded fasteners 50 mounted on the transmission 20 extend obliquely relative to the up-down direction and along a radial direction of the transmission 20. The radial direction of the electric motor 10 refers to a direction in which a straight line passes through the center of the circle in the cross section of the electric motor 10, and the radial direction of the transmission 20 refers to a direction in which a straight line passes through a center of a transmission shaft of the transmission 20.

Optionally, the controller support 31 includes a first mounting tongue 51, and the wire harness rack 32 includes a second mounting tongue 52. The threaded fasteners 50 are disposed on the first mounting tongue 51 and the second mounting tongue 52.

In particular, the first mounting tongue 51 connected to the transmission 20 extends along a tangential direction of the transmission 20 in a width direction of the first mounting tongue, and extends along a radial direction of the transmission 20 in a length direction of the first mounting tongue. The first mounting tongue 51 and the second mounting tongue 52 connected to the electric motor 10 extend in a tangential direction of the electric motor 10 in width directions of the first mounting tongue and the second mounting tongue and extend along a radial direction of the electric motor 10 in length directions of the first mounting tongue and the second mounting tongue. The first mounting tongue 51 serves to increase a force bearing area of the controller support 31, the transmission 20, and the electric motor 10.

Similarly, the second mounting tongue 52 serves to increase a force bearing area of the wire harness rack 32 and the electric motor 10. Accordingly, the threaded fasteners 50 achieve a better effect of fixing and have a higher structural stability.

Further, mounting studs 53 are respectively disposed on the electric motor 10 and the transmission 20, the mounting studs 53 having internal threads matching the threaded fasteners 50. The mounting studs 53 are disposed corresponding to the first mounting tongue 51 and the second mounting tongue 52. The threaded fasteners 50 extend through the first mounting tongue 51 and the second mounting tongue 52 into the mounting studs 53 and fit internal threads of the mounting studs 53. Accordingly, threaded connection between the threaded fasteners 50 and the electric motor 10 and the transmission 20 may be more stable, and the mounting studs 53 may serve to protect the threaded fasteners 50.

According to a further embodiment of the present disclosure, as shown in FIG. 5, there are a plurality of first mounting tongues 51 distributed at intervals along a circumferential direction of the controller support 31. Threaded fasteners 50 are disposed on each of the first mounting tongues 51. The circumferential direction of the controller support 31 refers to a direction toward a periphery of the controller support 31 when the controller support 31 is viewed from the top in a vertical direction. The plurality of first mounting tongues 51 are disposed on a side wall of the controller support 31 and are spaced apart. Accordingly, the configuration of the plurality of first mounting tongues 51 provides a better effect of fixing between controller support 31, the electric motor 10, and the transmission 20.

Still referring to embodiments shown in FIG. 2 and FIG. 5, a signal line connector 33 is disposed on one side surface of the controller support 31. The wire harness rack 32 is mounted on the other side surface of the controller support 31. Each of remaining side surfaces of the controller support 31 except the two side surfaces has at least one of the first mounting tongues 51.

A signal line connector 33 is disposed on a side surface of the controller support 31 far away from the electric motor 10. The signal line connector 33 is configured to connect a signal line to the controller 30. A wire harness rack 32 is mounted on a side surface of the controller support 31 far away from the transmission 20. The two side surfaces intersect with each other. At least one first mounting tongue 51 is disposed on each of two side surfaces opposite to the two side surfaces.

Further, the controller support 31 has a first side surface 311, a second side surface, a third side surface, and a fourth side surface 312 connected in sequence along a circumferential direction of the controller support 31. The first side surface 311, the second side surface, the third side surface, and the fourth side surface are arranged clockwise along a circumferential direction of the controller support 31.

As shown in FIG. 2 to FIG. 5, the first side surface 311 is a side surface located on a left side of the controller support 31, the second side surface is a side surface located on a rear side of the controller support 31, the third side surface is a side surface located on a right side of the controller support 31, and the four side surface 312 is a side surface located on a front side of the controller support 31.

The signal line connector 33 is disposed on the first side surface 311, the second side surface faces the transmission 20, the third side surface faces the electric motor 10, and the wire harness rack 32 is mounted on the fourth side surface 312. One first mounting tongue 51 is disposed on the second side surface. The first mounting tongue 51 is located at an end of the second side surface adjacent to the first side surface 311. Two of the first mounting tongues 51 are disposed on the third side surface, and the two first mounting tongues 51 are respectively adjacent to two ends of the third side surface.

Further, as shown in FIG. 5, the first mounting tongue 51 on the second side surface is mounted to the transmission 20 through the threaded fasteners 50, and the remaining first mounting tongues 51 and a second mounting tongue 52 are respectively mounted to the electric motor 10 through the threaded fasteners 50.

Figure 6:
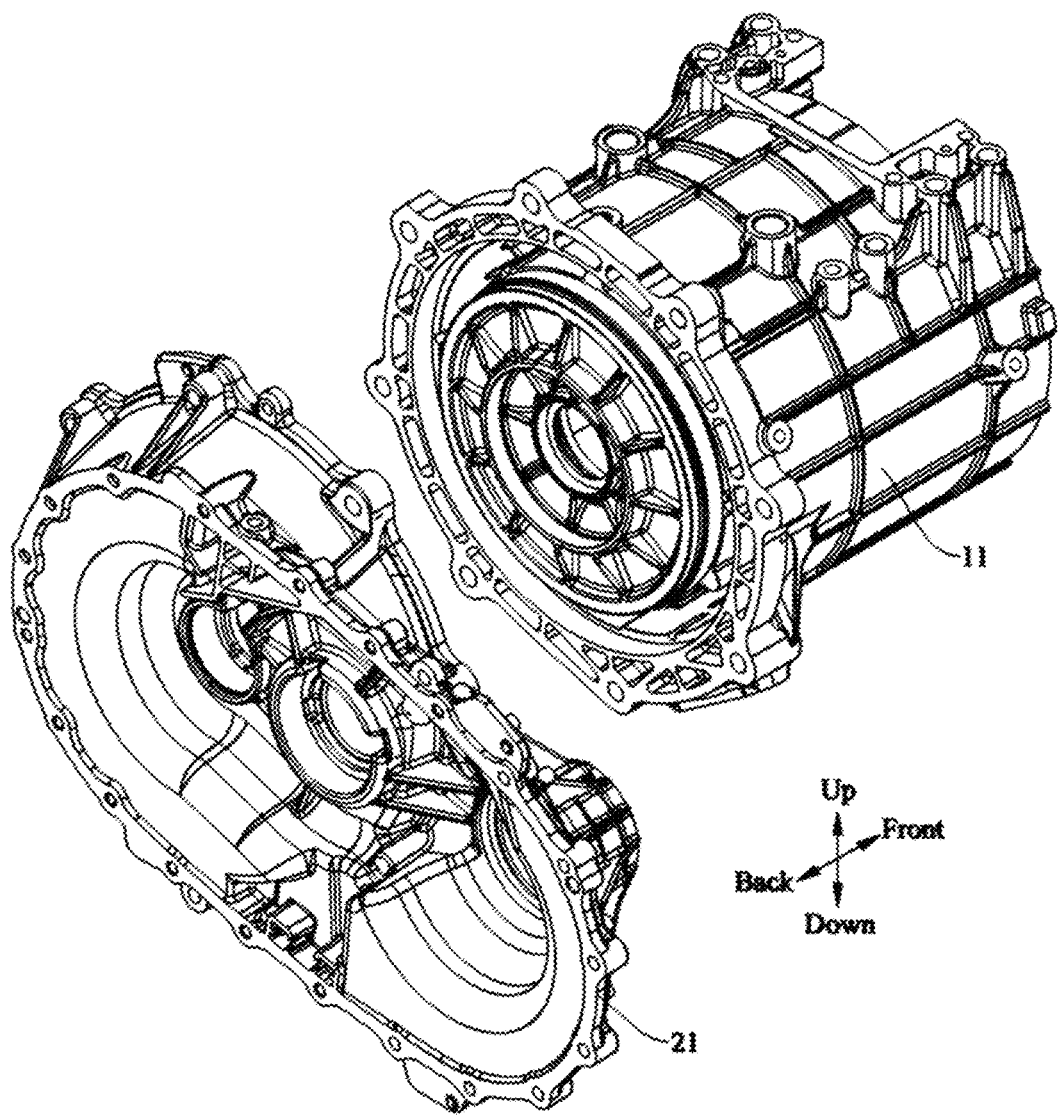
FIG. 6 is a schematic structural view of an electric motor case body and a front transmission case body of a powertrain according to an embodiment of the present disclosure.
Figure 7:
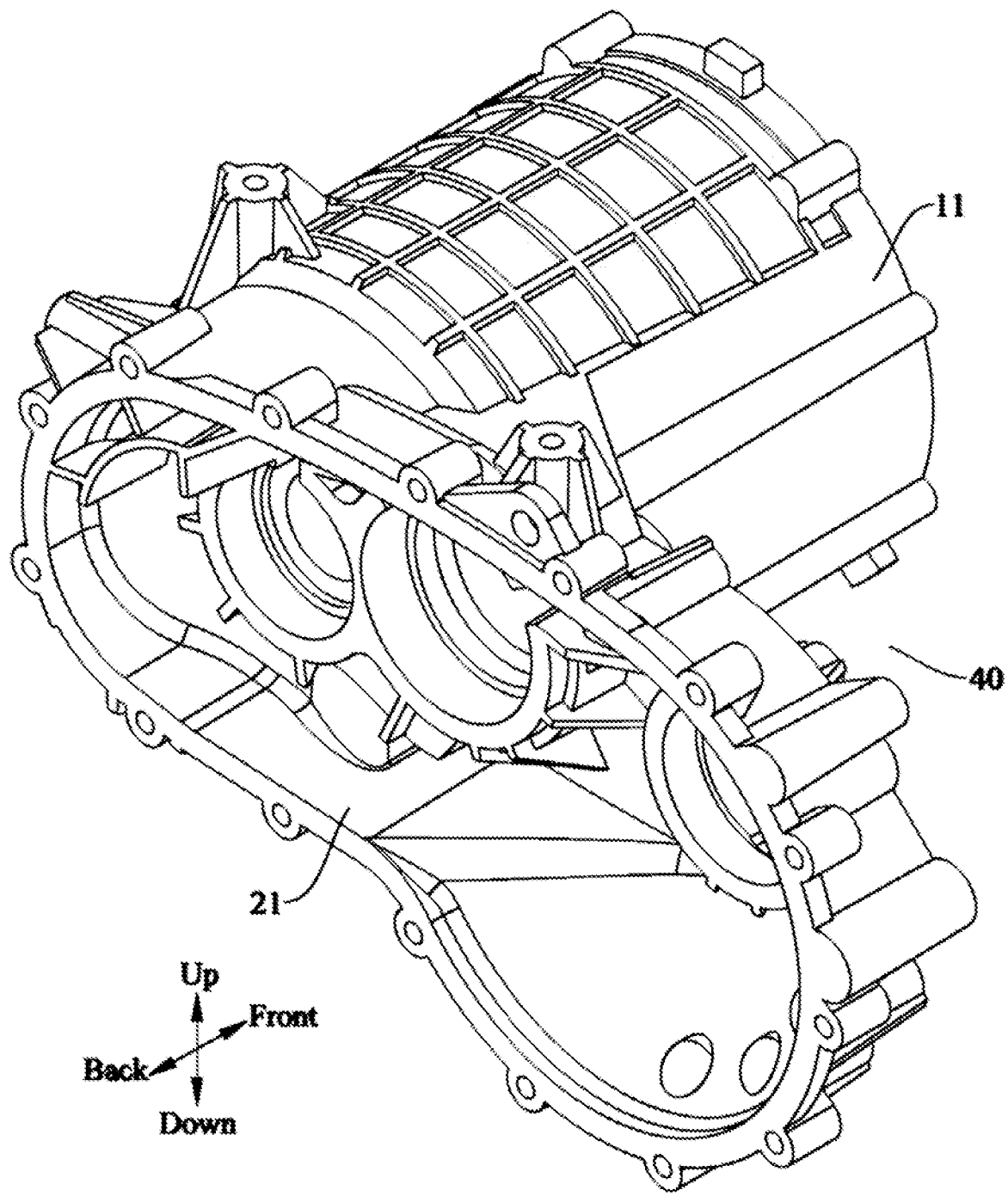
FIG. 7 is a schematic structural view of an electric motor case body and a front transmission case body of a powertrain according to another embodiment of the present disclosure.

In some embodiments of the present disclosure, as shown in FIG. 5 to FIG. 7, the electric motor 10 includes an electric motor case body 11. The transmission 20 includes a front transmission case body 21 and a rear transmission case body 22. The front transmission case body 21 is connected to the electric motor case body 11. The rear transmission case body 22 is disposed away from the electric motor case body 11. The angled space 40 is defined by the electric motor case body 11 and the front transmission case body 21. The controller 30 is mounted to the electric motor case body 11 and the front transmission case body 21.

In one embodiment of the present disclosure, as shown in FIG. 6, the electric motor case body 11 and the front transmission case body 21 are both separate pieces and assembled together. In other words, the electric motor case body 11 and the front transmission case body 21 are separately manufactured and then assembled together.

In another embodiment of the present disclosure, as shown in FIG. 7, the electric motor case body 11 and the front transmission case body 21 are an integral piece. In other words, the electric motor case body 11 and the front transmission case body 21 may be manufactured by integral molding. Accordingly, an overall structure formed by the electric motor case body 11 and the front transmission case body 21 has better stability and is conveniently processed and manufactured, omitting a procedure of assembled mounting.

A vehicle 1000 according to an embodiment of the present disclosure is described below with reference to FIG. 8.

Figure 8:
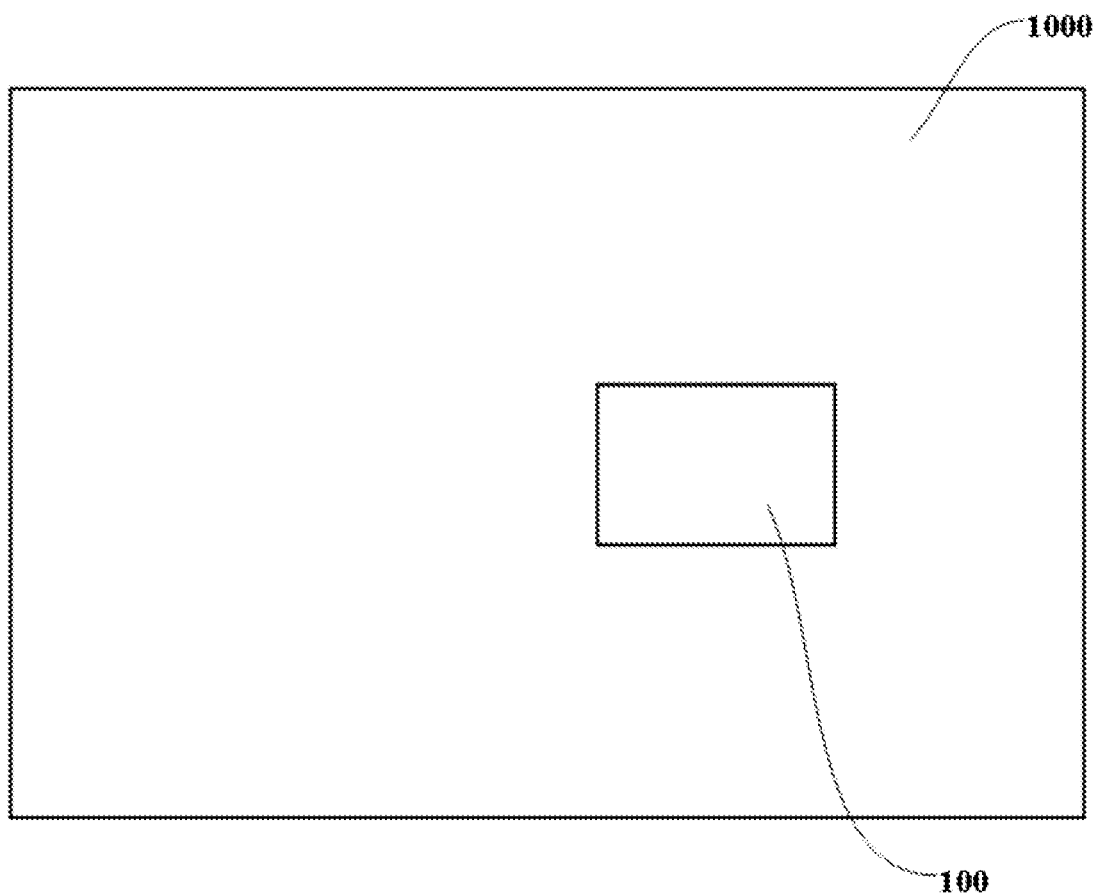
FIG. 8 is a schematic view of a vehicle according to an embodiment of the present disclosure.

As shown in FIG. 8, the vehicle 1000 according to embodiments of the present disclosure includes the powertrain 100 according to the foregoing embodiments of the present disclosure.

For the vehicle 1000 according to embodiments of the present disclosure, the powertrain 100 according to the foregoing embodiment of the present disclosure is used, reducing the layout space of the entire vehicle, simplifying the wire harness connection and protection, simplifying the structure of the entire vehicle, and reducing assembly procedures.

In one embodiment of the present disclosure, the powertrain 100 includes an electric motor 10, a transmission 20, and a controller 30.

The electric motor 10 includes an electric motor case body 11. The transmission 20 is transmissibly connected to the electric motor 10, and the transmission 20 includes a transmission case body. The electric motor case body 11 and the transmission case body are integrated into an entire case body, and the electric motor case body 11 and the transmission case body define an angled space 40 for helping a half shaft of the transmission to extend along an axial direction of the transmission. The controller 30 is electrically connected to the electric motor 10, and the controller 30 is mounted in at least one of the electric motor case body 11 and the transmission case body in the angled space 40. In other words, the controller 30 may be mounted to the electric motor case body 11 in the angled space 40 or to the transmission case body, or mounted to both the electric motor case body 11 and the transmission case body.

For the powertrain 100 according to embodiments of the present disclosure, the electric motor case body 11 and the transmission case body are integrated into one entire case body to simplify an entire structure of the powertrain 100, and reduce assembly procedures, requiring no long wire harness connected between the controller 30 and the electric motor 10 and simplifying wire harness connection and protection. In addition, the controller 30 is mounted to at least one of the electric motor case body 11 and the transmission case body in the angled space 40 to cause a mounting space of the powertrain 100 to be smaller and a structure to be more compact.

Other compositions and operations of the powertrain 100 and the vehicle 1000 including the powertrain according to the embodiments of the present disclosure are known to those of ordinary skill in the art, and are not described herein again in detail.

In the description of this specification, the description of the reference terms such as "an embodiment", "some embodiments", "exemplary embodiments", "example", "specific example", or "some examples" means that the specific features, structures, materials or characteristics described with reference to embodiments or example are included in at least one embodiment or example of the present disclosure. In this specification, schematic descriptions of the foregoing terms do not necessarily directed at a same embodiment or example. Moreover, the specific features, structures, materials, or characteristics described may be combined in any one or more embodiments or examples in an appropriate manner.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A powertrain, comprising:
   an electric motor;
   a transmission mounted to the electric motor and defining, together with the electric motor, an angled space for helping a half shaft of the transmission extend along an axial direction of the transmission; and
   a controller mounted to at least one of the electric motor and the transmission and electrically connected to the electric motor; wherein:
   the controller, the transmission, and the electric motor are integrated together, at least one part of the controller being located in the angled space,
   the controller has a mounting groove, and
   the mounting groove is disposed on a side of the controller.

2. The powertrain according to claim 1, wherein, in an up-down direction, the controller overlaps with the electric motor and/or the transmission to reduce a height of a unity formed by the controller, the electric motor, and the transmission.

3. The powertrain according to claim 1, wherein
   the controller comprises a controller three-phase wire connection portion located in the mounting groove, and
   the electric motor comprises an electric motor three-phase wire connection portion, the electric motor three-phase wire connection portion extending into the mounting groove and being electrically connected to the controller three-phase wire connection portion.

4. The powertrain according to claim 3, wherein the controller three-phase wire connection portion is docked with the electric motor three-phase wire connection portion and connected to the electric motor three-phase wire connection portion through a connecting member.

5. The powertrain according to claim 1, wherein the electric motor comprises an electric motor case body, and the transmission comprises a front transmission case body and a rear transmission case body, the angled space being defined by the electric motor case body and the front transmission case body, and the controller being mounted to the electric motor case body and the front transmission case body.

6. The powertrain according to claim 5, wherein the electric motor case body and the front transmission case body are both separate pieces and assembled together.

7. The powertrain according to claim 5, wherein the electric motor case body and the front transmission case body are an integral piece.

8. A powertrain, comprising:
   an electric motor;
   a transmission mounted to the electric motor and defining, together with the electric motor, an angled space for helping a half shaft of the transmission extend along an axial direction of the transmission; and
   a controller mounted to at least one of the electric motor and the transmission and electrically connected to the electric motor; wherein:
   the controller, the transmission, and the electric motor are integrated together, at least one part of the controller being located in the angled space,
   wherein the controller comprises:
   a controller body;
   a controller support, the controller body being disposed on the controller support, and the controller support being mounted to at least one of the electric motor and the transmission; and
   a wire harness rack mounted to the controller support and the electric motor and having a wire arrangement groove.

9. The powertrain according to claim 8, wherein the wire harness rack and the transmission are respectively located on two opposite sides of the electric motor in a horizontal direction.

10. The powertrain according to claim 8, wherein the wire harness rack extends obliquely relative to an up-down direction and along a radial direction of the electric motor.

11. The powertrain according to claim 8, wherein
    the controller support, the electric motor, and the transmission, and the wire harness rack and the electric motor are mounted through threaded fasteners.

12. The powertrain according to claim 11, wherein
    the threaded fasteners mounted to the electric motor extend obliquely relative to an up-down direction and along a radial direction of the electric motor, and
    the threaded fasteners mounted to the transmission extend obliquely relative to the up-down direction and along a radial direction of the transmission.

13. The powertrain according to claim 11, wherein the controller support comprises a first mounting tongue and the wire harness rack comprises a second mounting tongue, the threaded fasteners being disposed on the first mounting tongue and the second mounting tongue.

14. The powertrain according to claim 11, wherein mounting studs are respectively disposed on the electric motor and the transmission, the mounting studs having internal threads matching the threaded fasteners.

15. The powertrain according to claim 14, wherein there are a plurality of first mounting tongues distributed at intervals along a circumferential direction of the controller support, the threaded fastener being disposed on each of the first mounting tongues.

16. The powertrain according to claim 15, wherein a signal line connector is disposed on one side surface of the controller support, the wire harness rack being mounted on the other side surface of the controller support, each of remaining side surfaces of the controller support except the two side surfaces having at least one of the first mounting tongues.

17. A powertrain, comprising:
an electric motor comprising an electric motor case body;
a transmission connected to the electric motor in a transmission manner and comprising a transmission case body; the electric motor case body and the transmission case body being integrated into an entire case body, and the electric motor case body and the transmission case body defining an angled space for helping a half shaft of the transmission to extend along an axial direction of the transmission; and
a controller electrically connected to the electric motor and mounted to at least one of the electric motor case body and the transmission case body in the angled space, wherein:
the controller has a mounting groove, and
the mounting groove is disposed on a side of the controller.

* * * * *